Oct. 6, 1970          R. BRAUNSTEIN ET AL          3,532,879
METHODS AND APPARATUS FOR DEFLECTING ATOMS
Filed Dec. 12, 1966                              3 Sheets-Sheet 1
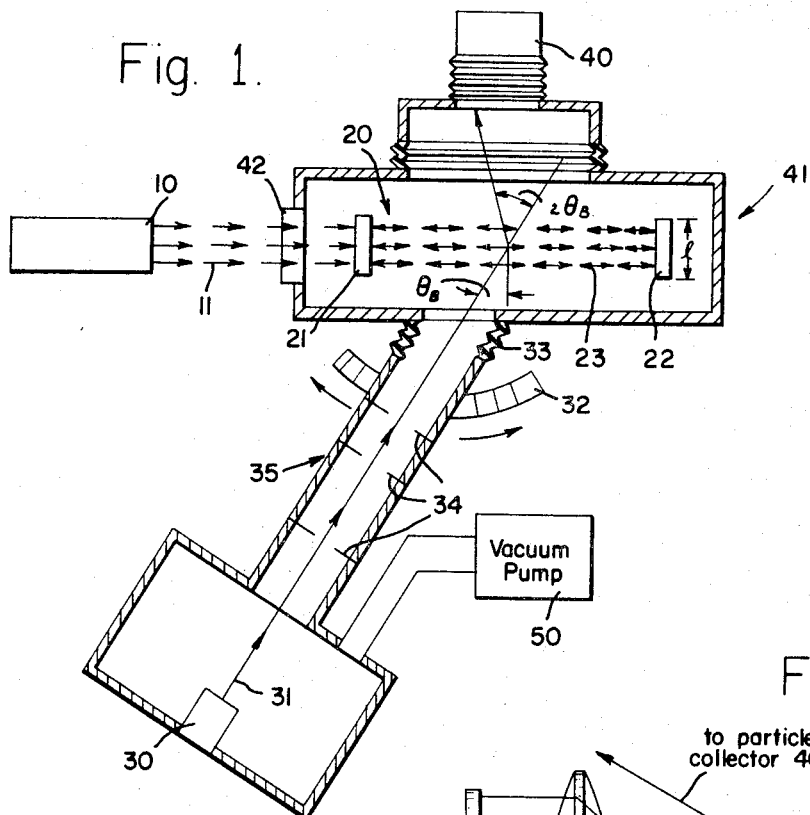
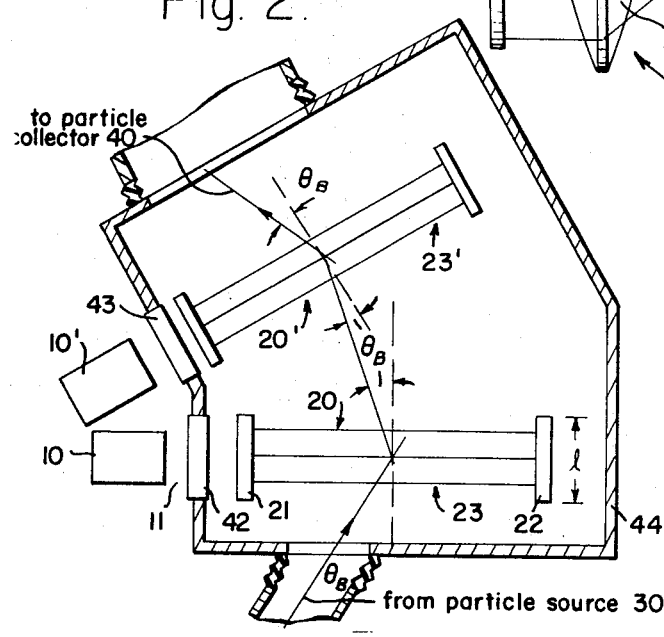
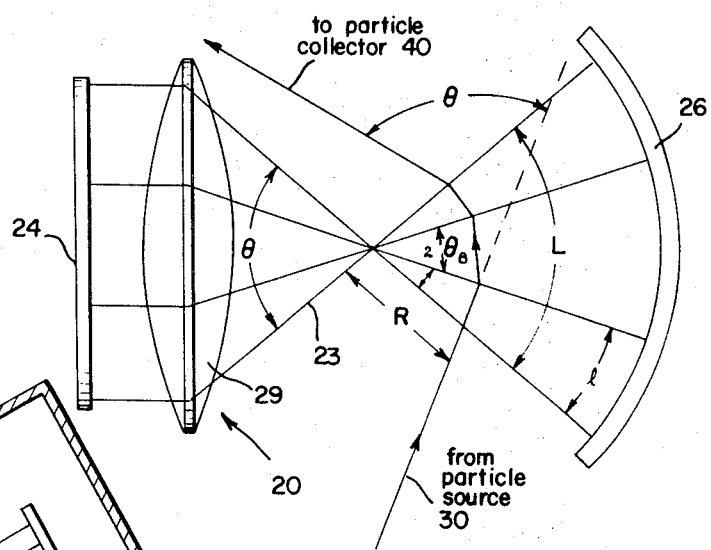
Saul Altshuler,
Rubin Braunstein,
Lee M. Frantz,
    INVENTORS.
BY Edward Dugas
              AGENT.

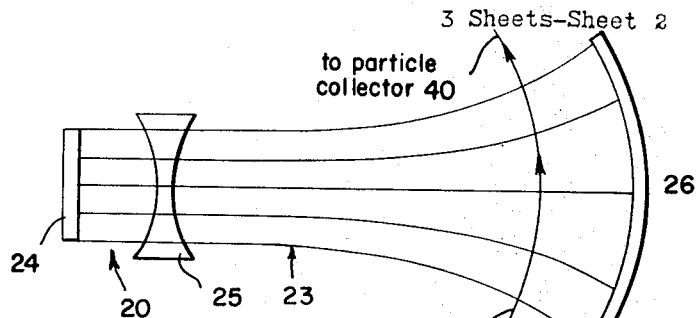
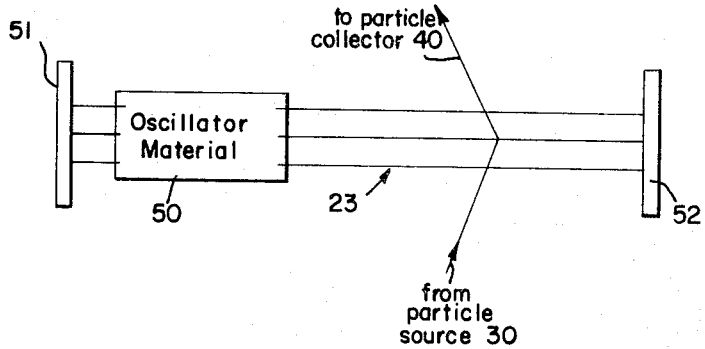
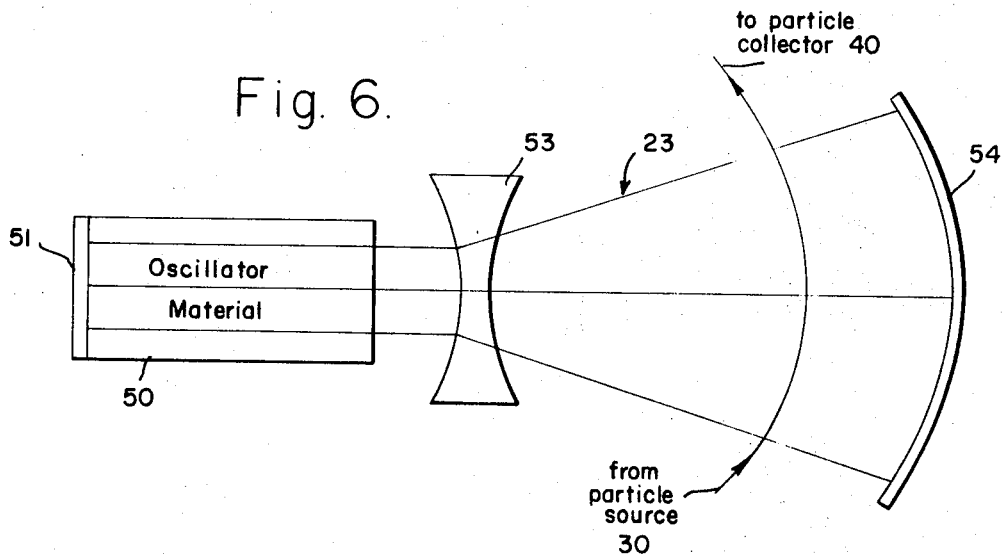
Saul Altshuler,
Rubin Braunsteir
Lee M. Frantz,
INVENTORS.

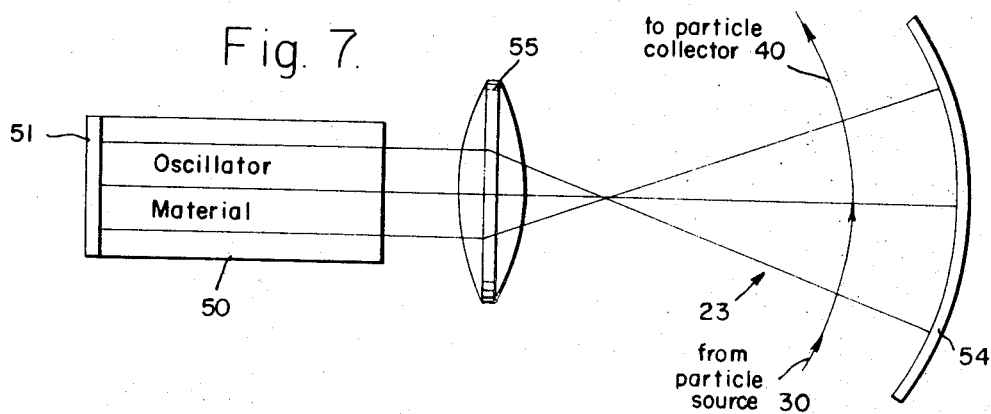
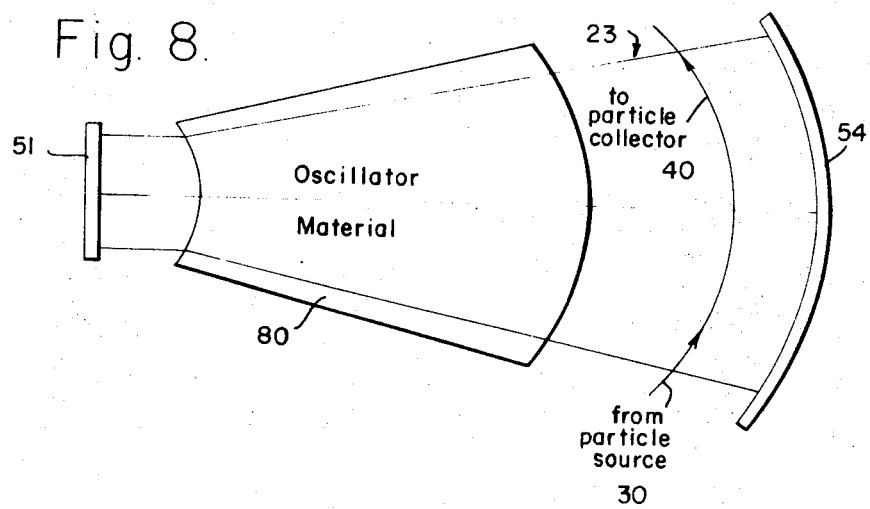
Saul Altshuler,
Rubin Braunstein,
Lee M. Frantz,
INVENTORS.

United States Patent Office 3,532,879
Patented Oct. 6, 1970

3,532,879
METHODS AND APPARATUS FOR DEFLECTING ATOMS
Rubin Braunstein, Pacific Palisades, Lee M. Frantz, Redondo Beach, and Saul Altshuler, Manhattan Beach, Calif., assignors to TRW Inc., Redondo Beach, Calif., a corporation of Ohio
Filed Dec. 12, 1966, Ser. No. 600,947
Int. Cl. H01j 39/34
U.S. Cl. 250—41.9                   11 Claims

ABSTRACT OF THE DISCLOSURE

This invention pertains to a method and apparatus for the controlled deflection of atomic particles, and more specifically this invention pertains to a method and apparatus for deflecting atoms or molecules (neutral or ionized) with electromagnetic standing waves. Shanding electromagnetic waves are generated in an optical cavity with a laser. A beam of particles is directed against the standing waves at an angle corresponding to a Bragg reflection law. Particles having a momentum which satisfies the reflection law will be reflected; all others will pass on through the standing waves without being deflected.

BACKGROUND OF THE INVENTION

This invention can accomplish a selective deflection of atoms or molecules according to their state of excitation or their mass or both. In the case of ions there are conventional means of deflection which use static or quasi-static electric or magnetic fields. However, even for ions there presently exists no conventional method which can discriminate between excited internal states of a given ion. Although there are molecular beam techniques for coupling to the electric or magnetic static moment of a neutral particle, these techniques utilizing inhomogenous electric and magnetic fields yield very small angular deflections as a result of the intrinsically weak coupling, and consequently require relatively long beam paths for accompilshing a significant spatial separation. However, the present invention utilizes a completely different interaction mechanism which couples strongly to the particle so that smaller radii of curvature of the atomic trajectory are easily obtained. Another advantage of the present method is that it applies equally well to ionic as well as to neutral species of any excited state, whereas the conventional molecular beam method does not apply in the case of ions.

The method and apparatus of the present invention has immediate utility in that it makes it possible to separate excited neutrals (or ions) from their unexcited states in a controlled manner and thus can provide a pure beam of excited atomic particles. This invention also makes it possible to deflect neutral atoms and to provide pure beams of atoms having selected states of excitation.

SUMMARY OF THE INVENTION

This invention is based upon the recognition that a neutral atom (excited or unexcited) which impinges upon standing electromagnetic waves in an appropriate manner strongly interacts with the standing wave field and is deflected. This is a process engendered by the absorption and stimulated emission of photons, wherein the net effect upon the atomic particle is an elastic scattering. The principle as applied to electrons is described in articles by P. L. Kapitza and P. A. M. Dirac, Proc. Cambridge Phil, Soc. 29, 297 (1933) and L. S. Bartell, et al., Phys. Rev. Letters 14,851, May 1965. The principle is based on the ability of standing electromagnetic waves to scatter electrons according to a Bragg reflection law. The scattering of the atoms depends directly upon the ordinary differential cross-section $$\frac{d\sigma\,(\pi)}{d\Omega}$$

for backscattering of a photon from the atom.

The prior art as exemplified by the above mentioned articles has completely failed to appreciate that neutral atoms or molecules (neutral or ionized) may also be deflected from standing electromagnetic waves.

It is therefore an object of the present invention to provide a new and novel method for deflecting neutral or ionized particles utilizing electromagnetic standing waves.

It is another object of the present invention to provide a method of separating atoms according to their internal excitation energy.

It is another object of the present invention to provide apparatus for accomplishing the aforementioned objects.

In a preferred form of the present invention, the foregoing objects are achieved by generating electromagnetic standing waves in a vacuum cavity and impinging a particle beam at a preselected angle $\theta_B$ upon the standing waves. The angle $\theta_B$ is given by the equation $$\theta_B = \sin^{-1}\frac{\hbar\omega}{Mvc}$$

where M and v are the mass and velocity of the beam particles, c is the velocity of light, and $\hbar\omega$ is the photon energy of a beam particle. The particles are deflected by the standing waves and collected or utilized by a utilization device.

BRIEF DESCRIPTION OF THE DRAWINGS

The aforementioned and other objects of the present invention will become more apparent when taken in conjunction with the following description and drawings in which like numbers designate like parts and wherein:

FIG. 1 illustrates a preferred apparatus embodiment for carrying out the method of this invention, utilizing an electromagnetic standing wave cavity;

FIG. 2 illustrates a second embodiment of the invention, utilizing a plurality of electromagnetic standing wave cavities;

FIG. 3 illustrates a modification of the electromagnetic cavity of FIG. 1, utilizing a positive lens;

FIG. 4 illustrates a second modification of the electromagnetic cavity of FIG. 1, utilizing a negative lens;

FIG. 5 illustrates a third embodiment of the invention wherein the electromagnetic standing wave cavity is a laser cavity;

FIG. 6 illustrates a modification of the laser cavity of FIG. 5, utilizing a negative lens and a curved reflector;

FIG. 7 illustrates a second modification of the laser cavity of FIG. 5, utilizing a positive lens and a curved reflector; and FIG. 8 illustrates a third modification of the laser cavity of FIG. 5, utilizing laser material formed as a divergent lens and a curved reflector.

DESCRIPTION OF THE PREFERRED EMBODIMENTS

Referring to FIG. 1, a source of electromagnetic energy 10, which may be a laser, provides a beam of light energy 11 into the electromagnetic standing wave cavity 20. The optical cavity is comprised of two plane mirrors 21 and 22. Mirror 22 is totally reflective and mirror 21 is partially reflective so as to permit transmission of the light beam 11 into the optical cavity 20. The mirrors are spaced such that standing waves are generated in the cavity.

A particle beam 31 derived from a particle source 30 impinges at the appropriate angle $\theta_B$ upon the standing waves in the cavity 20 and emerges after being deflected through an angle $2\theta_B$ after traversing the optical cavity. A particular collector 40 collects the deflected particle beam. Housings 35 and 41 provide a vacuum tight structure for the cavity 20 and the particle source 30. The vacuum pump 50 maintains the vacuum in these housings.

The angular relationship between the particle beam 31 and the standing waves 23 is varied by rotating the position of housing 35 with respect to housing 41. Bellows 33 provides a flexible vacuum tight joint between the two housings. A calibrated scale 32 provides an accurate angular deference for the positioning of housing 35.

A transparent window 42 is positioned through housing 41 to provide a transmission path for the light beam 11 from source 10 to the optical cavity 20 while maintaining the vacuum environment within the housings.

In operation of the appartus an atom of momentum $\vec{p}$ enters the optical cavity containing the standing light waves 23. The standing light waves may be thought of as being a superposition of two traveling light waves. The momenta of the photons comprising the traveling waves are $$\vec{\hbar k} \text{ and } -\vec{\hbar k}$$

The interaction event is essentially a stimulated backscattering of a photon by the atom, that is, a scattering of a traveling wave photon from a mode associated with one propagation direction into the mode associated with the opposite direction. The atom, therefore, acquires an additional momentum $\pm 2\vec{\hbar k}$. However, the energy in the radiation field remains unchanged, so that the magnitude of the atom's momentum must also remain unchanged. The energy conservation required $$\frac{p^2}{2M} = \frac{p'^2}{2M}$$

leads to the so-called Bragg condition which must hold if the scattering is to take place. Namely, the incident atom must be inclined relative to the normal by an angle $\theta_B$, given by:

$$\sin \theta_B = \frac{\hbar k}{p} \quad (1)$$

It also follows directly from energy and momentum conservation that the atom is scattered through an angle $2\theta_B$. Furthermore, it follows from symmetry considerations that the initial and final momenta $\vec{p}$ and $\vec{p}'$ may be interchanged. In other words, an incident atom with momentum $\vec{p}$ scatters to momentum $\vec{p}'$ and an atom incident with momentum $\vec{p}$, scatters to momentum $\vec{p}$. The reciprocal mean free path $1/l$ for scattering the atom is given by:

$$\frac{1}{l} = \frac{4\pi^3 n^2 c^4}{\omega^2 \gamma v} \frac{d\sigma(\pi)}{d\Omega} \quad (2)$$

where $n$ is the photon density, $\omega$ is the angular frequency of the electromagnetic rediation, $v$ is the velocity of the atom, $\gamma$ is the spectral width of the electromagnetic radiation, $c$ is the speed of light, and $d\sigma(\pi)/d\Omega$ is the differential cross section for backscatter of a photon from the particle.

If the mean free path $l$ is made so small that the atom undergoes more than a single deflection, then according to the argument above, it must execute a zig-zag trajectory, going alternately from $\vec{p}$ to $\vec{p}'$ to $\vec{p}$, etc. This means that a large net deflection cannot occur using a standing light wave configuration where the light rays are parallel as in FIG. 1. The zig-zag trajectory occurs because after, say, the first scattering where a momentum $2\vec{\hbar k}$ is imparted to the atom, the Bragg condition is now satisfied for imparting a momentum $-2\vec{\hbar k}$ in the opposite direction, and so forth. In FIG. 2, a second optical cavity 20', identical in construction to optical cavity 20, is placed in the vacuum housing 44 so as to have its standing waves 23' in the path of the deflected particle beam from optical cavity 20 at the same Bragg angle. Successive deflections thereby achieve a large net deflection. An electromagnetic energy source 10', similar to energy source 10, provides a beam of electromagnetic (light) energy 11', through the transparent window 43, in the wall of housing 44 to the optical cavity 20'. The padticles from source 30 enter optical cavity 20 and 20' at the Bragg angle $\theta_B$, providing net angular deflection of $4\theta_B$. A plurality of optical cavities may be used to obtain even larger deflections. In FIG. 4, the optical cavity 20 has its standing wave rays 23 flared by use of the negative lens 25 and the curved mirror 26. The partially reflective plane mirror 24 is positioned opposite the mirror 26 to form and define the optical cavity 20. The flaring of the standing wave rays 23 provides for a multiple-scattering configuration similar to the plurality of linear cavities of FIG. 2.

It is also possible to achive successive momentum increments that are essentially in the same direction by focusing the standing waves to a point within the cavity such that the waves flare both before and after passing the focal point. In FIG. 3, the optical cavity 20 is comprised of a partially transparent plane mirror 24, a positive lens 29, and a curved mirror 26. The mirrors (reflectors) 24 and 26 define the optical cavity 20. Particles from source 30, shown in FIG. 1, impinge on the standing waves 23, are deflected, and finally are collected at the particle collector 40, also shown in FIG 1. Since the particle or atom is reflected through an angle $2\theta_B$ for each scattering distance $l$, the light rays must be rotated in a similar fashion. The rotation of the rays is accomplished by focusing, with the focal point at a distance R from the atomic trajectory. The desired Bragg condition for successive scatterings is then satisfied if $$l = 2\theta_B R \quad (3)$$

For attaining a large net scattering, the scattering length $l$ should be quite small; so small, in fact, that the spectral width of the laser radiation is dominated by broadening due to the uncertainty principle. The time required for a transition is $t = l/v$, so that the angular frequency of the laser radiation is uncertain by an amount $\gamma = v/l$. This freqency spread is unaviodable in principle. Therefore, we substitute $\gamma = v/l$ into Equation 2 and obtain $$l = \frac{v\omega}{2\pi^{3/2} nc^2 \sqrt{\frac{d\sigma}{d\Omega}}} \quad (4)$$

The value of $l$ obtained from Equation 4 can be substituted for the $l$ in Equation 3.

In considering power requirements, it is to be recognized that the attainable power can be considerably increased by placing the laser material within the optical cavity 20, such that the optical cavity is also a laser cavity. FIG. 5 illustrates such an arrangement. The oscillator material 50 which may be a laser material such as a ruby is interposed in the linear optical cavity formed by the totally reflective plane mirrors 51 and 52.

FIG. 6 shows another flaring arrangement for the optical cavity 20 which utilizes the oscillator material 50 interposed between the plane mirror 51 and a curved mirror 54. Both mirrors are totally reflective. A negative lens 53 is interposed between the oscillator material 50 and the curved mirror 54 to flare the standing waves 23.

In FIG. 7, the negative lens 53 of FIG. 6 is removed and a positive lens 55 is substituted. The standing light rays are focused to a point within the laser cavity by the positive lens 55. The focusing in this cavity is similar to that performed by positive lens 29 in the optical cavity of FIG. 3.

In FIG. 8, the oscillator material 80 is formed in the shape of a diverging lens so as to effectively flare the standing wave rays 23 along substantially non-parallel paths.

In summary, a field of standing electromagnetic waves is created. Particles in the form of a beam are directed against the standing waves at an angle which satisfies the Bragg condition for the frequency of the electromagnetic waves and the desired particle energy. Particles in the beam having the desired energy will be deflected by the standing waves providing a deflected particle beam of pure particles having a predetermined energy state.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the time scope of the invention.

What is claimed is:

1. The method of operating an electromagnetic standing wave vacuum cavity as a neutral particle deflector which comprises the steps of:
    (a) applying electromagnetic wave energy to said cavity so as to generate standing waves;
    (b) impinging a beam of selected neutral particles at an angle $\theta_B$ on said electromagnetic standing waves where the angle $$\theta_B = \sin^{-1} \frac{\hbar\omega}{Mvc}$$

wherein M and v are the mass and velocity of the beam particles respectively, c is the velocity of light, and $\omega$ is photon energy of said electromagnetic wave energy; and
    (c) collecting and utilizing the beam of neutral particles deflected from said electromagnetic standing waves.

2. The method of operating an electromagnetic standing wave cavity as a neutral particle deflector which comprises the steps of:
    (a) applying electromagnetic wave energy to said cavity so as to generate standing waves;
    (b) impinging a beam of neutral particles on said electromagnetic standing waves at a preselected angle, causing controlled reflection of a desired group of particles from said beam; and
    (c) collecting said reflected particles.

3. The method of operating an electromagnetic standing wave cavity as a particle deflector which comprises the steps of:
    (a) applying electromagnetic wave energy to said cavity so as to generate standing waves;
    (b) focusing said waves through a focal point in said cavity so as to flare said waves; and
    (c) impinging a beam of selected particles on said electromagnetic standing waves at a preselected angle causing controlled reflection of desired groups of particles from said beam.

4. A particle deflecting apparatus comprising in combination:
    optical cavity means;
    means generating electromagnetic standing waves in said optical cavity means;
    a neutral particle beam source; and
    means directing said neutral particle beam at the Bragg angle such that said particle beam impinges on and is reflected by said electromagnetic standing waves at a desired angle related to said Bragg angle.

5. The method of operating an electromagnetic standing wave cavity as a neutral particle deflector which comprises the steps of:
    (a) applying electromagnetic wave energy to said cavity so as to generate standing waves in a flared pattern;
    (b) impinging a beam of neutral particles on said electromagnetic standing waves at a preselected angle to cause controlled reflection of a desired group of particles from said beam, said flared pattern substantially increasing the reflection of said desired group of particles; and
    (c) collecting said reflected particles.

6. A particle deflecting apparatus comprising in combination:
    (a) a plurality of optical cavity means;
    (b) means generating electromagnetic standing waves in said optical cavity means;
    (c) a neutral particle beam source; and
    (d) means directing said neutral particle beam at the Bragg angle such that said particle beam impinges on and is reflected by said electromagnetic standing waves at a desired angle related to said Bragg angle, each of said cavity means being angularly disposed from an adjacent cavity means by an amount substantially equivalent to the reflected angle of said particle beam.

7. A particle deflecting apparatus comprising in combination:
    (a) a partially transparent plane reflector;
    (b) a concave reflector having its reflective surface facing the reflective surface of said plane reflector and spaced from said plane reflector, said reflectors defining an optical cavity;
    (c) a lens interposed in said optical cavity for flaring electromagnetic waves;
    (d) means generating electromagnetic standing waves in said optical cavity;
    (e) a neutral particle beam source; and
    (f) means directing said neutral particle beam at the Bragg angle such that said particle beam impinges on and is reflected by said electromagnetic standing wave at a desired angle related to said Bragg angle.

8. A particle deflecting apparatus as defined in claim 7 wherein said lens is a negative lens for flaring the electromagnetic waves.

9. A particle deflecting apparatus as defined in claim 7 wherein said lens is a positive lens so as to focus electromagnetic waves at a focal point within said cavity.

10. A particle deflecting apparatus comprising in combination:
    (a) optical cavity means;
    (b) said optical cavity means including a first optically flat reflector and a second optically curved reflector positioned on opposite sides of said generating means to define said optical cavity means;
    (c) means generating electromagnetic standing waves in said optical cavity means, such generating means including an active laser material formed as a diverging lens;
    (d) a neutral particle beam source; and
    (e) means directing said neutral particle beam at the Bragg angle such that said particle beam impinges on and is reflected by said electromagnetic standing waves at a desired angle related to said Bragg angle.

11. A particle deflecting apparatus comprising in combination:
   (a) optical cavity means;
   (b) means generating electromagnetic standing waves in said optical cavity means;
   (c) a neutral particle beam source, said particles having different characteristics; and
   (d) means directing said neutral particle beam at the Bragg angle such that said particles beam impinges on and is reflected by said electromagnetic standing waves at a desired angle related to said Bragg angle, whereby particles having different characteristics are segregated in accordance with their mass, momentum or effective cross-section.

References Cited

UNITED STATES PATENTS

| | | | |
|---|---|---|---|
| 3,267,383 | 8/1966 | Lohmann | 331—94.5 X |
| 3,360,733 | 12/1967 | Vali et al. | 328—233 |

OTHER REFERENCES

Proceedings of Cambridge Philosophical Society, vol. 29, pp. 297–300, 1933, Kapitza et al.

Physical Review Letters, vol. 14, pp. 851–852, 1965, Bartell et al.

WALTER STOLWEIN, Primary Examiner

A. L. BIRCH, Assistant Examiner

U.S. Cl. X.R.

331—94.5